United States Patent [19]
Nelson

[11] 3,949,417
[45] Apr. 6, 1976

[54] SEQUENTIAL COLOR AND MEMORY DECODER

[75] Inventor: Larry Allan Nelson, Hillsboro, Oreg.

[73] Assignee: Tektronix, Inc., Beaverton, Oreg.

[22] Filed: Sept. 16, 1974

[21] Appl. No.: 506,381

[52] U.S. Cl. .................................. 358/14; 358/21
[51] Int. Cl.² ..................... H04N 9/40; H04N 9/535
[58] Field of Search ............ 358/14, 11, 18, 15, 33, 358/21; 178/DIG. 3

[56] References Cited
UNITED STATES PATENTS
3,863,264  1/1975  Nelson et al. ........................ 358/14

Primary Examiner—George H. Libman
Assistant Examiner—R. John Godfrey
Attorney, Agent, or Firm—Adrian J. La Rue

[57] ABSTRACT

A SECAM decoder for deriving the signals for a color display from the composite color picture signal determined largely by digital means having digital line switching, multiple delay lines, decoder center frequency clamps and indicator of drift of encoded white, dual digital phase detector for each phased locked loop decoder, switchable de-emphasis and a waveform squaring circuit whereby ease of adjustment to different recording subcarrier frequencies or to sequence color and memory standards is provided.

5 Claims, 9 Drawing Figures

Fig—1

SEQUENTIAL COLOR AND MEMORY DECODER

CROSS REFERENCE TO RELATED APPLICATION

The present application is copending with U.S. patent application Ser. No. 360,519, filed May 15, 1973 by Larry A. Nelson and Phillip Stephen Crosby for SEQUENTIAL COLOR AND MEMORY DECODER, now U.S. Pat. No. 3,863,264.

BACKGROUND OF THE INVENTION

In a Sequence Color and Memory Television System which is completely described in SECAM COLOUR T.V. SYSTEM, Imprimerie Nord-Graphique, Paris - $10^e$, hereinafter referred to as SECAM, the transmitted color subcarrier alternates between two color difference signals from line to line. For this reason SECAM color difference signals, $D'_B$ and $D'_R$, alternately modulate the subcarrier. As a result of this frequency modulation, the color signal is less sensitive to differential phase and differential gain. However, since only one color difference signal is transmitted at one particular time, some memory device must be used so that both such color difference signals are available simultaneously say, in the receiver or image producing device such as a color picture tube. Herein then, lies a disadvantage of the prior art, namely non-ideal delay line.

As is well-known the last color information to enter the SECAM delay line prior to the viewed line was the opposite color difference signal, any reflections due to such non-ideal delay line termination or construction will appear as cross colors at the output of the delay line. This cross color may be present from multiple reflections, with its amplitude reflecting the amount of time it has been present in the delay line. Some direct transmission through the delay line may also be present, but this is principally a property of the delay line construction. Such cross color represents a deterioration of a theoretical advantage over other systems of color television transmission which is basic to SECAM.

A next disadvantage is that in steering the alternating lines of color information from the output of the delay line and direct transmission to the input of the $D'_R$ and $D'_B$ demodulators, some cross talk must occur in the switch. Where the signals transmitted are analog, this represents a noticeable degradation of the chrominance signals.

Following the adding together of the previously mentioned color difference signals, such signals must be amplitude limited and frequency detected due to frequency modulation as discussed. The frequency detector, or modulator as hereinafter referred, produces an output dependent upon how much an input signal differs in frequency from an undeviated or rest frequency. In other words, amplitude variations of the color difference signals are derived in response to frequency variations. Thus, another disadvantage of the prior art.

As is well-known by those skilled in the art, many means of demodulation of a frequency modulated signal are known, one of which is the phase lock loop. In SECAM color systems large frequency deviations of the color subcarrier occur at a very fast rate. Because of this, it is very difficult to build a phase lock loop demodulator. Inherent in the construction of such demodulator is high loop gain and large loop bandwidth which tend to decrease the advantage of a phase lock loop demodulator over known methods of frequency detection run in an article written by C. J. Byrne entitled "Properties and Design of the Phase Controlled Oscillator with a Sawtooth Comparator" and published in the Bell System Technical Journal, March 1962, means including a sawtooth phase comparator are discussed to overcome the disadvantages of the more common sinusoidal phase comparators and thereby construct a phase locked loop which would be improved in some respects over phase locked loops mentioned above. Such improvement, if carried further, could be used to make a more improved phase lock loop demodulator for a SECAM color system.

Additionally, de-emphasis networks for compensating the pre-emphasis networks is also well known in SECAM systems. Herein lies another disadvantage in that such de-emphasis introduces well known errors during an interval of time reserved for the blanking signal.

BRIEF SUMMARY OF INVENTION

The present invention overcomes the disadvantages of the prior art in that the color difference signals are digitized at the incoming subcarrier level prior to being applied to the delay line. Digitizing of such signals eliminates the effect of cross talk within the switch. Further, routing of the color difference signals through multiple delay lines reduce reflections below any desired level. These two advantages combine to provide virtually no cross color, a theoretical advantage of the SECAM system. A further advantage is that the digitizing of the color difference signals at the incoming subcarrier level provides better equivlanet noise bandwidth because of the digital phase detector which enables a lower bandwidth phase lock loop to be used.

The present invention further overcomes the disadvantage of the prior art in that any switching before or after the delay line(s) can consist of simple logic gates. Also, by using digital signals corresponding to the color difference signal subcarrier and decoding such signals based upon both a positive and a negative transition, a very appreciable increase in decoder accuracy, speed, and equivalent noise bandwidth can be obtained.

Additionally, the present invention overcomes the disadvantages of the prior art in that a switchable de-emphasis network is provided so that errors normally introduced during blanking are not enhanced by the de-emphasis network.

It is therefore an object of the present invention to provide an improved SECAM decoding having digital signals corresponding to the color difference signal subcarrier.

It is another object of the present invention to provide a SECAM decoder wherein cross color between color difference signals due to delay line reflections is practically eliminated.

It is yet another object of the present invention to provide a SECAM decoder having a plurality of delay lines.

It is a further object of the present invention to provide a SECAM decoder wherein digital switching of the color difference signal subcarrier is provided.

It is still a further object of the present invention to provide a SECAM decoder wherein two dual digital sawtooth phase comparators are used.

It is still yet another object of the present invention to provide a waveform squaring circuit whereby color difference subcarrier signals are digitized.

It is an additional object of the present invention to provide a SECAM decoder having a switchable de-emphasis network.

The subject matter of the present invention is particularly pointed out and distinctly claimed in the concluding portion of this specification. The invention, however, both as to organization and method of operation together with further advantages and objects thereof, may best be understood by reference to the following description taken in connection with the accompanying drawings wherein like reference characters refer to like elements.

IN THE DRAWINGS

DETAILED DESCRIPTION OF INVENTION

Figure 1:
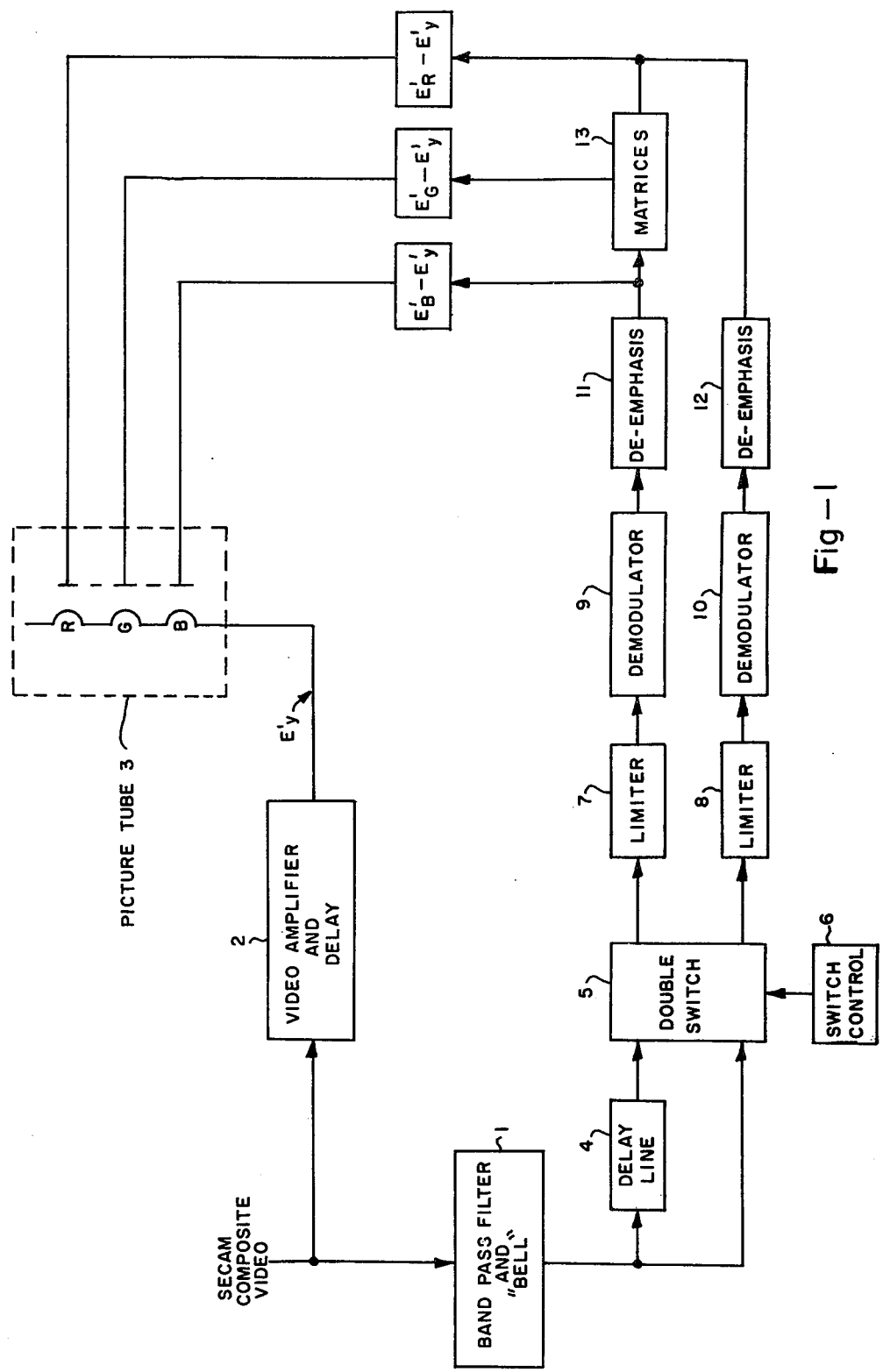
FIG. 1 is a block diagram of a conventional SECAM decoder.

FIG. 1 shows a block diagram of a conventional SECAM decoder. Composite video, comprising a luminance signal portion, a chrominance signal subcarrier portion, and a synchronization signal portion, all of which are added together in a conventional manner, is applied to a Band Pass Filter and "Bell" stage 1 and a video amplifier and delay stage 2. In a conventional matter, the luminance and synchronization portions of the composite video signal are separated from the chrominance portion of the composite video signal. The luminance and synchronization signals are passed through the video amplifier and delay stage 2 which separates the synchronization information from the luminance, delays the luminance, then applies it to a picture tube 3. Although not shown, the synchronization portion of the signal is used to synchronize the deflection and timing circuits as is well-known.

The chrominance portion of the signal is then applied to a "Bell" having characteristics opposite to the "Bell" of the encoder. Thus, the chrominance signal has its modulated subcarrier re-established to the correct amplitude. As is well-known, the chrominance portion of the composite video signal leaving the band pass filter and bell stage 1 consists of two color difference signals corresponding to the color red minus luminance and the color blue minus luminance, hereinafter referred to as $D'_R$ and $D'_B$. As previously mentioned, $D'_R$ and $D'_B$ are transmitted sequential i.e., a line of $D'_R$, where line refers to the time required between synchronization pulses, is transmitted followed by a line of $D'_B$, etc.

The decoder is equipped with a memory 4, hereinafter referred to as Delay Line, to continuously record the color difference signal transmitted, either $D'_R$ or $D'_B$, and repeating the one transmitted the line before. Using this method, two chrominance difference signals, one restored by the delay line 4 and the other directly, are obtained simultaneously. An electronic double switch 5, controlled by a switch control 6, is provided so that in a first position, the direct color difference signal is applied to a first limiter 7 and the memorized color difference signal is applied to a second limiter 8, and reversing the direction of switching during the next line so that in a second position, the direct color difference signal is applied to the second limiter 8 and the memorized color difference signal is applied to the first limiter 7. As can be discerned from the above, the output to either the first limiter 7 or the second limiter 8 will be the two color difference signals simultaneously.

Limiters 7 and 8 are used to limit any amplitude variations in either the $D'_R$ or $D'_B$ signals occuring during the transmitting process. Following limiters 7 and 8, the color difference signals are demodulated by demodulators 9 and 10. In principle, the demodulator supplies an output signal which is proportional to the deviation in the instantaneous frequency of the $D'_R$ and $D'_B$ subcarrier received. As is well-known, the demodulator which may be used is the standard phase locked loop to produce a signal which follows the incoming FM signal with its voltage controlled oscillator. The phase comparator of the phase locked loop is the error detector of the loop and, as usually constructed, produces an output voltage which is proportional to the sine of the phase difference of the voltage controlled oscillator, Vco as hereinafter referred, and the incoming FM signal.

The voltages hwich drive the Vco corresponding to $D'_R$ and $D'_B$ are applied to de-emphasis stages 11 and 12 having characteristics opposite to the pre-emphasis of the encoder wherein the high frequency components are returned to their original value for reasons well-known. The output of each de-emphasis stage is applied to matrix 13 wherein the combination of $D'_R$ and $D'_B$ produce a third color difference signal $E'_g - E'_y$ i.e., green minus luminance. The three signals, obtained by matricing from the chrominance signals previously described, are applied to the proper electrodes of picture tube 3. Hence, if picture tube 3 is a color picture tube, the currents of the beams caused by luminance $E'_y$ are proportional to the signals red, green, and blue.

Figure 2:
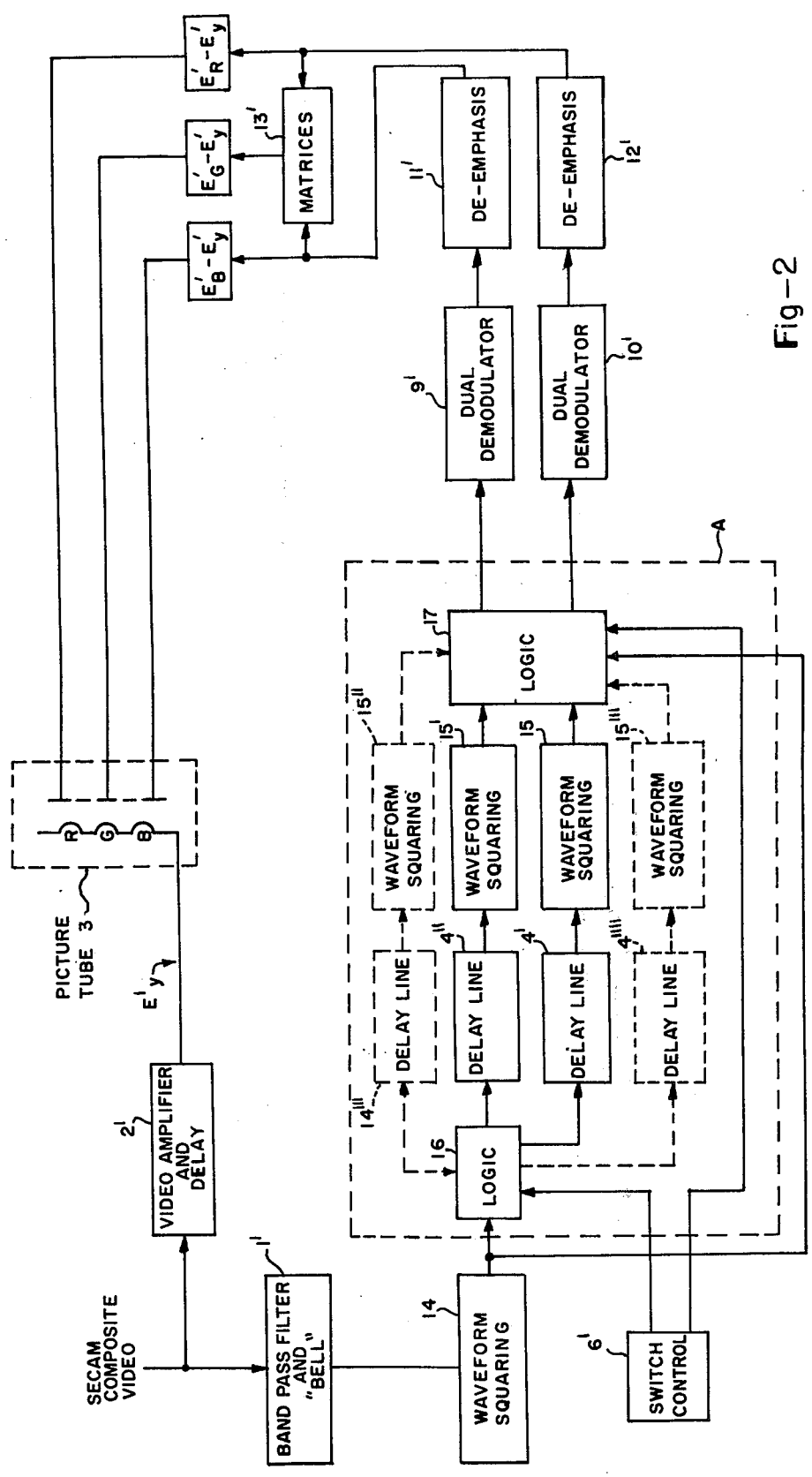
FIG. 2 is a block diagram of a SECAM decoder according to the present invention.

FIG. 2 is a block diagram of the SECAM decoder according to the present invention. As can be seen from this block diagram, a first waveform squaring stage 14 and a plurality of second waveform squaring stages 15, 15', 15'' and 15''' have been added. In addition, first logic stage 16 and second logic stage 17 have been added. Replacing delay line 4 of FIG. 1 is a plurality of delay lines 4', 4'', 4''', and 4''''. It should be noted that at least two delay lines and second waveform squaring stages 4' – 15 and 4'' – 15' respectively must be used, but in no way should the idea of more than two such sets of stages be disregarded. In addition, double switch 5, limites 7 and 8 and demodulators 9 and 10 of FIG. 1 have been replaced by dual demodulators 9' and 10' respectively.

Basically, the improvement comprises means to convert the frequency modulated color difference signals $D'_R$ and $D'_B$ subcarrier into digital signals. These digital signals are more easily switched and enables the use of a special phase comparator which decreases equivalent noise bandwidth. By using digital signals it is now feasible to completely elminate any cross talk due to delay lines and switching. Second waveform squaring circuits 15, 15', 15'' and 15'''' must be used to convert the signal at the delay line outputs back to a digital signal. This is because the digital signal passing down the delay lines, which in reality is a band pass filter, produces an analog signal. As the present invention uses digital signals, the delayed signal must be reconverted. For simplicity, all the waveform squaring circuits are identical. Logic stages 16 and 17 are required for routing the digital signals into and out of the delay lines in proper sequence. Logic stages 16 and 17 have circuitry therein which is determined by the number of delay line-waveform squaring sets used.

As only digital signals are present, such logic stages can be a simple logic function as is well known. The output of logic stage 17 routes the signals to the dual demodulators. Finally dual demodulators 9' and 10' have replaced limiters 7 and 8 and demodulators 9 and 10 respectively. By digitizing and using sawtooth phase detectors, there is no need of separate limiters which were required for best performance of the prior art. Demodulators 9' and 10' have the advantage over conventional demodulators in that its phase detector output is linear for larger values of phase error. However, even though phase errors can be detected very quickly and over a large range of phase errors using the sawtooth phase comparator in the phase locked loop, described by C. J. Byrne and previously discussed, it is limited in that the time required to distinguish a phase error is determined by the time between the input positive leading edges. This is because the flip-flops, operation will be discussed later in the specification, used have their set input controlled by positive leading edges of pulses digitally derived from input signals, originally sinusoids. In the case of SECAM, the deviation of the subcarrier is not a small percentage of the undeviated subcarrier frequency. To adapt this type of phase comparator to use, the present invention uses two such flip-flops. The positive edges are used as before, however, the negative leading edges of the input signal and the negative leading edges of the Vco signal are also used to drive a second flip-flop. This doubles the gain of the phase comparators and reduces time between the input phase change and the output response of the phase comparators so that in effect a sample is taken at each zero crossing of an input signal rather than only the positive zero crossings. Further, the output of the phase detector flip-flops are uniquely combined to enhance the capabilities of the phase locked loop. The output of dual demodulators are then applied via a pair of selectably switched de-emphasis stages to the remaining stages as discussed previously for the prior art.

Figure 3:
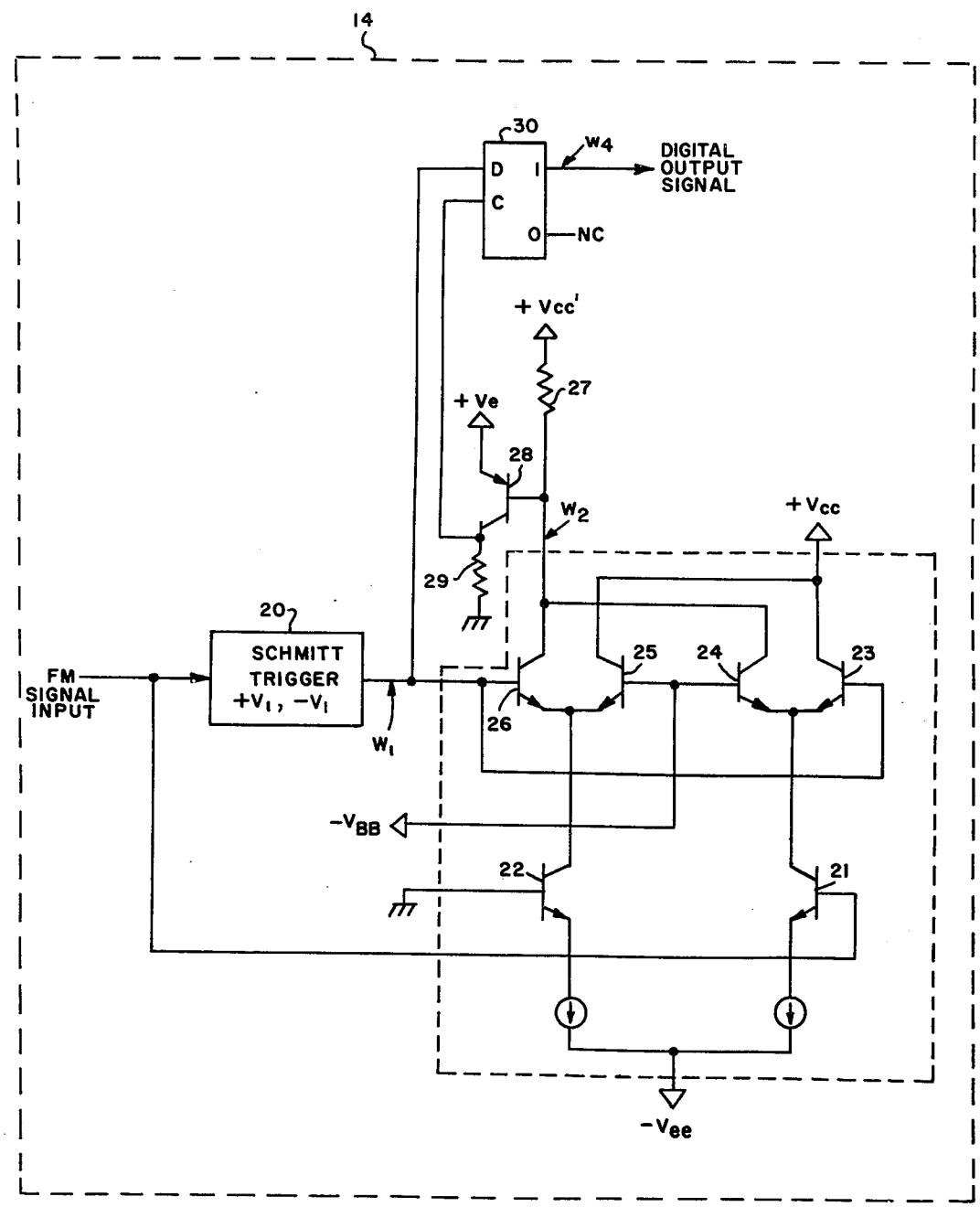
FIG. 3 is a schematic drawing of the waveform squaring circuit shown in FIG. 2.
Figure 4:
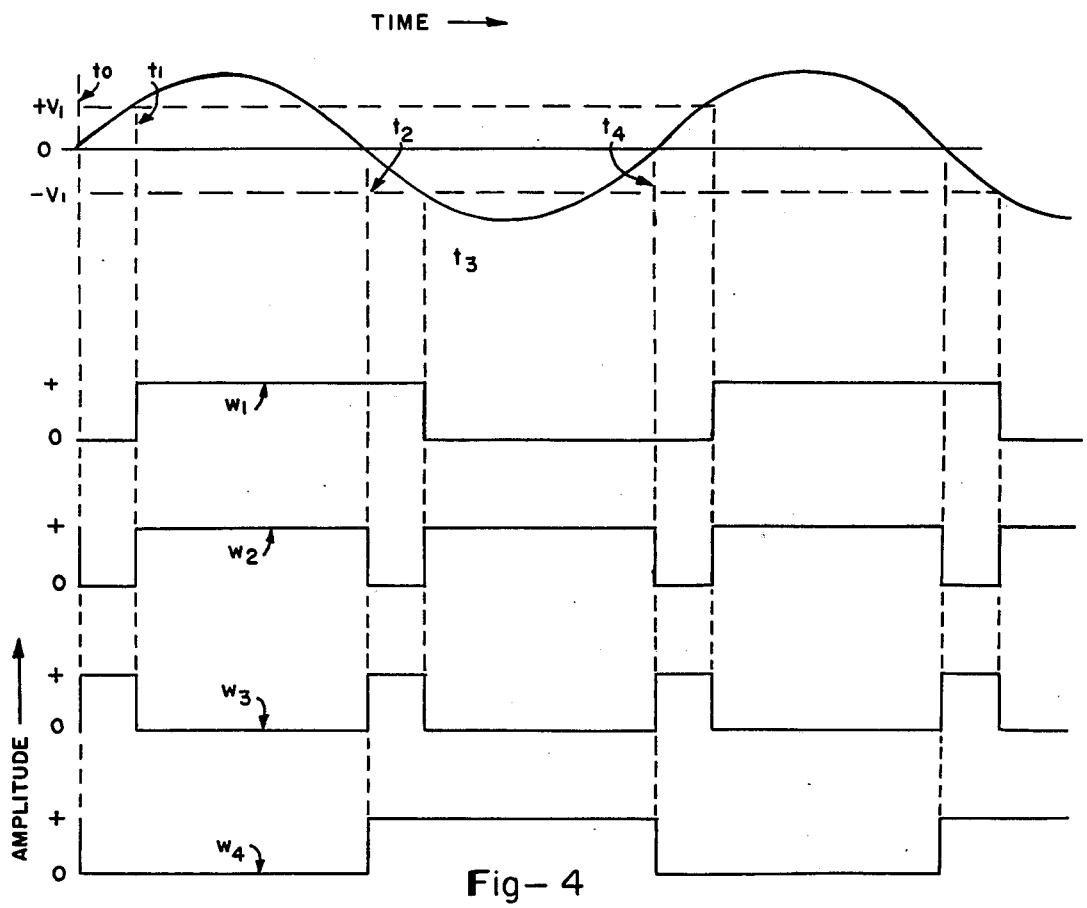
FIG. 4 is a voltage vs. time graph for the waveform squaring circuit of FIG. 3.

The operation of the present invention, especially with regard to digitizing the color difference signals $E'_R$ and $E'_B$ subcarrier can best be understood by referring to FIGS. 3 and 4 taken in conjunction with FIG. 2. As shown in FIG. 3, the waveform squaring circuit 14 takes as an input the FM signal corresponding to the color difference signals $D'_R$ and $D'_B$ and produces a digital output signal. The digital output signal, shown in FIG. 4, has been obtained from the zero crossings of the input sinusoid.

The input FM signal, a sinusoid, is simultaneously applied to a Schmitt trigger stage 20 and the base electrode of transistor 21. As the Schmitt trigger is well-known by those skilled in the art, it will suffice to know that waveform $W_1$ of FIG. 4 is produced provided the trigger points $+V_1$ and $-V_1$ as shown in FIG. 4 are exceeded at its input.

The emitter electrode of transistor 21 is connected to the emitter electrode of transistor 22 and to a source of proper electrical potential -Vee (Current sources are indicated by the arrows within the small circles.) The base electrode of transistor 22 is connected to a source of proper electrical potential, ground. The collector electrodes of transistors 21 and 22 are directly connected to transistor pairs 23, 24 and transistor pairs 25, 26 wherein each transistor pair has their emitter electrodes connected together and to said collector electrodes of transistors 21 and 22 respectively. The base electrode of transistor 24 and the base electrode of transistor 25 and the collector electrode of transistor 23 and the collector electrode of transistor 25 are connected together respectively, and are then connected to a source of proper electrical potential $-V_{BB}$ and $+V_{CC}$ respectively. The base electrodes of transistors 23 and 26 are connected together and connected to the output of said Schmitt trigger 20. The collector electrodes of transistors 24 and 26 are connected together and to a source of proper electrical potential $+V_{CC}'$ via a dropping resistor 27. Also, connected directly to the collector electrodes of transistors 24 and 26 is the base electrode of an inverting transistor 28 whose emitter electrode is connected directly to a source of proper electrical potential $+V_e$ and whose collector electrode is connected to a source of proper electrical potential, ground, via a dropping resistor 29. An edge triggered flip-flop has its data input D also connected to the output of the Schmitt trigger 20 and a clock input C connected directly to the collector electrode of transistor 28. The output waveform $W_4$ of the completed circuit is takne at the logic "1" output of said flip-flop 30.

To further understand circuit operation, consider the following circuit conditions exist at a time just prior to time $t_o$. At such time, the input FM signal is assumed to be crossing the zero axis in a positive direction, hence has reset the schmitt trigger to produce the waveform $W_1$ when it passed negatively through the trip point $-V_1$. Transistors 21, 23, and 26 are reversed biased; transistors 22, 24, and 25 are forward biased. As a result, a current passes via transistors 22 and 25 from the $+V_{cc}$ supply to the $-V_{cc}$ supply. The voltage drop across the resistor 27 will be zero so that waveform $W_3$ is at a "high" level. Transistor 28 is reversed biased and no voltage is developed across the resistor 29. The waveform $W_2$ is therefore at a low level. The low level of waveform $W_3$ being applied to the clock input of the flip-flop 30 inhibits change of state of the flip-flop 30 and the waveform $W_4$ at a high level is available at the "1" output of such flip-flop.

At time $t_o$, transistor 21 is forward biased by the input FM signal as such signal crosses the zero axis. As a result, current now passes through transistors 21 and 24 from $+V_{cc}'$ through resistor 27 to $-V_{cc}$. The voltage drop across the resistor 27 forward biases transistor 28. Current via resistor 29 due to the conduction of transistor 28 produces a voltage drop across such resistor which is applied to the flip-flop 30 input. The transition from the "low" level to the "high" level of waveform $W_3$ transfers the level of waveform $W_1$ to the output, hence waveform $W_4$ is low.

At a next time $T_1$, the schmitt trigger 20 is tripped by the input FM signal reaching a second trip voltage $+V_1$. Transistors 23 and 26 become forward biased; transistors 24 and 25 are reversed biased. As transistor 22 is now reversed biased, no current is passed through resistor 27. As a result, transistor 28 is reversed biased to produce the waveform $W_3$. Output waveform $W_4$ therefore remains at the low level. At a next time $T_2$, it becomes obvious that the waveform $W_4$ goes to a high level. As can be discerned from the above discussion, the output waveform $W_4$ changes from the high to low state or vice-versa at each zero crossing of the input FM signal. The zero crossings are thus preserved as is required for proper operation of the dual demodulator which will be covered in detail later in the specification.

It should be noted that transistors 21, 22, 23, 24, and 25 are connected in a manner well-known as a modulator-demodulator circuit and may be of discrete components or an integrated circuit, as shown by the dashed lines, such as a Motorola, Inc. MC 14966 Modulator-Demodulator. Further, the waveform squaring circuits 15, 15′, 15″ and 15‴ following the delay lines are identical to that shown in FIG. 3 and is incorporated for reasons already discussed.

Figure 5:
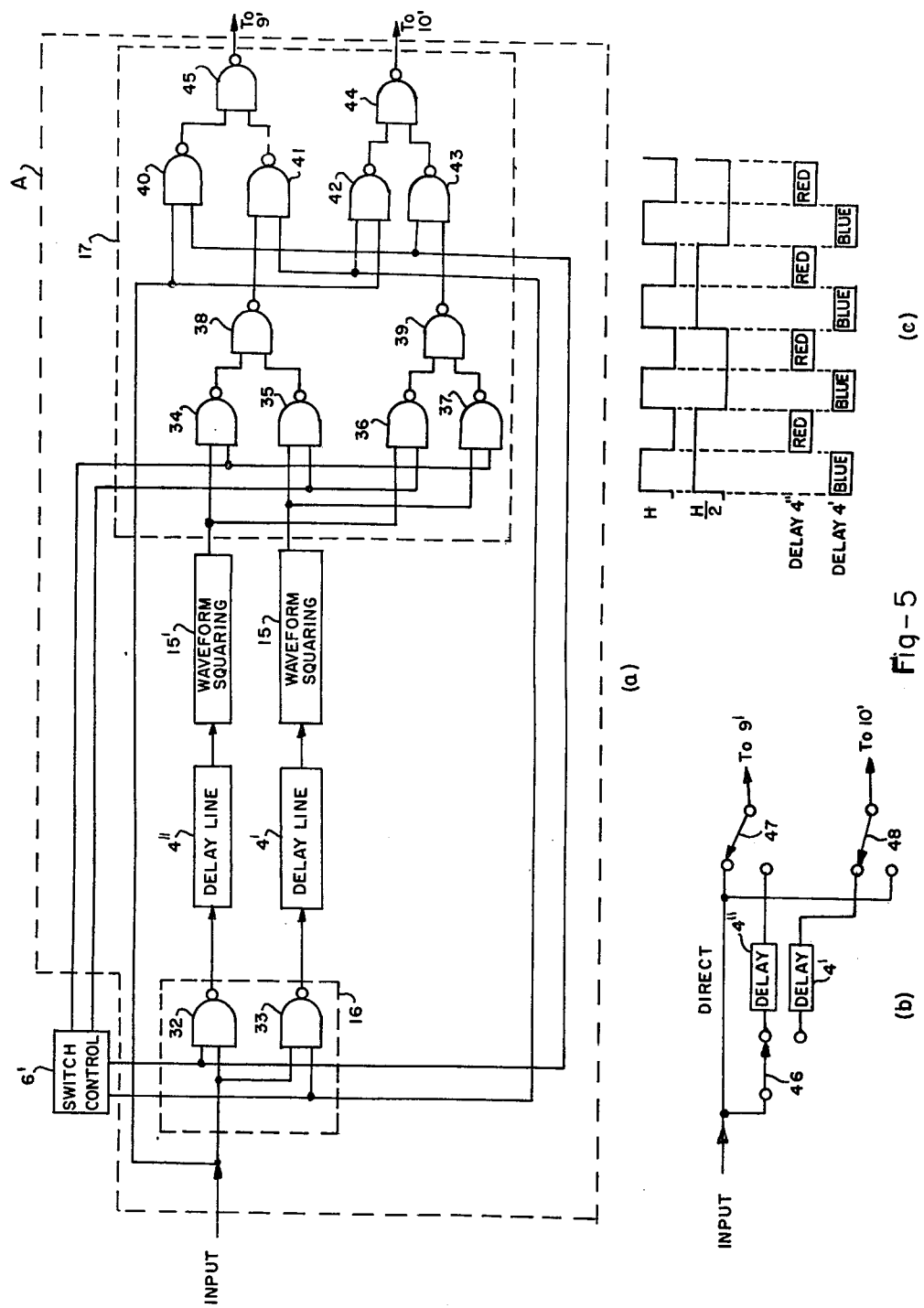
FIG. 5 is a hybrid drawing of the portion A shown in FIG. 2.

To understand operation of the SECAM decoder between the output of the first waveform squaring stage 14 and the input to the dual demodulators 9′ and 10′ reference should be made to FIG. 5. FIG. 5 details operation using two delay lines 4′ and 4″. As already has been stated, operation should not be limited to two such delay lines. For example, if say four delay lines were used, logic stages 16 and 17 would require additional logic. Basically, the digital input signal is applied alternately directly and delayed to the dual demodulators 9′ and 10′.

A switch control 6′ produces timing signals corresponding to H, H̄ (logical not H), H/2, and H̄/2 (logical not H/2). Such timing signals are synchronous with the synchronization portion of the composite video signal applied to the input of the decoder. The timing signals and the digital input signal are "NANDED" together using logic "NAND" gates 32 – 45. The required logic functions can be developed many ways. As this type of logic operation is well-known, it will not be discussed in detail. As shown in FIG. 5b, the entire portion A of FIG. 2 can be thought of as three switches 46, 47, and 48. Each switch is operated at an H rate such that the output of such portion is applied to demodulators 9′ and 10′ alternately direct, delayed, etc. FIG. 5c, together with FIG. 5b, is a graph showing how, for example, each signal passes to the demodulators with respect to the timing signals. Since operation of the waveform squaring stages 15′ and 15 have already been discussed along with why they must be used, no further mention is deemed necessary.

Figure 6:
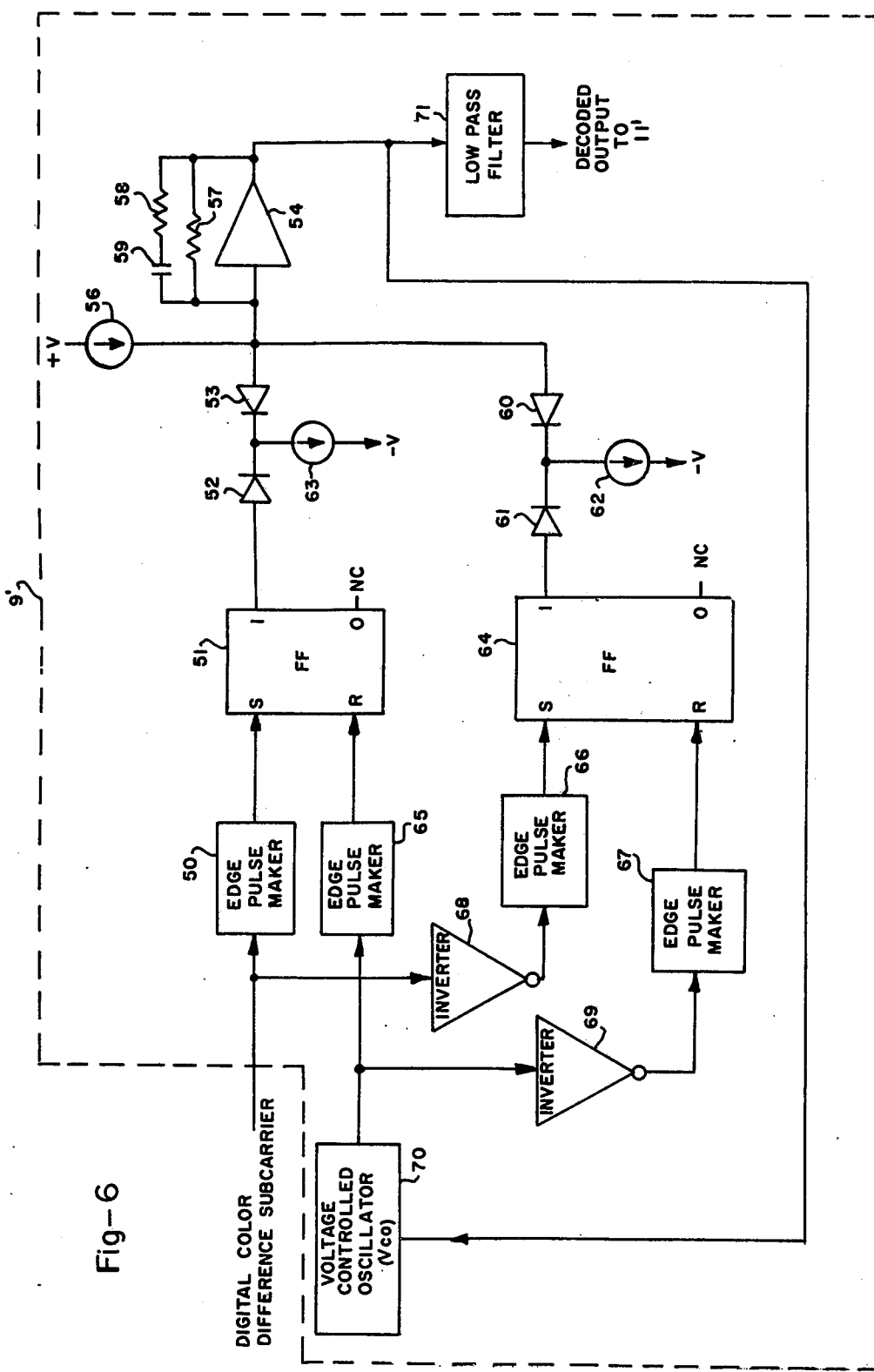
FIG. 6 is a schematic drawing of the dual demodulator of FIG. 2 according to the present invention.

A demodulator having a dual sawtooth phase comparator used in a phase lock loop according to the present invention is shown in FIG. 6. As dual demodulator 9′ and 10′ are identical only the dual demodulator 9′ will be discussed. Basically the stage uses the previously mentioned zero crossings of the digital signal corresponding to the color difference signal $D'_R$ and $D'_B$ subcarrier to supply an output signal which is proportional to the deviation in the instantaneous frequency of the $D'_R$ and $D'_B$ subcarrier received.

The digital color difference subcarrier is applied to an edge pulse maker 50 and an inverter 68 simultaneously. Edge pulse maker 50 can be thought of as a differentiator in that on each positive excursion of the input digital signal, an edge pulse is obtained. However, in reality, edge maker 50 consists of various logic functions whereby the pulse obtained is of sufficient duration to properly drive the following flip-flop. Such edge pulse has its leading edge coincident with the positive excursion of the digital input signal. Inverter 68 inverts the digital input signal in a conventional manner and applies it to a second edge pulse maker 66. Edge pulse maker 66 is identical to edge pulse maker 50 hence an edge pulse is obtained at its output coincident however, with the leading edge of the negative excursion of the digital input signals. The edge pulses developed by edge pulse makers 50 and 66 are then applied to the set inputs of set-reset flip-flops 51 and 64 respectively.

The "1" outputs of such flip-flops 51 and 64 are connected to the anodes of diodes 52 and 61 respectively. The cathodes of diodes 52 and 61 are connected to the cathodes of diodes 53 and 60 and are also connected to separate suitable potentials −V via current means 63 and 62 respectively. The anodes of diodes 53 and 60 are connected together and are also connected to a suitable potential + V via current source 56. Also, connected to current source 56, diode 53, and diode 60 at a common point is the input to an operational amplifier 54 whose output is connected to such common point via a resistor 57 having a resistor 58 and a capacitor 59 connected in series with one another connected in parallel with such resistor 57.

The output of operational amplifier is also connected to the input of a low pass filter 71 and the input control stage of the voltage controlled oscillator 70. The output of voltage controlled oscillator 70 is simultaneously applied to a third edge pulse maker 65 and a second inverter 69. The output of such third edge pulse maker 65 is connected to the reset input of the set-reset flip-flop 51. The output of inverter 69 drives a fourth edge pulse maker 67 whose output is connected to the reset input of the set-reset flip-flop 64. The output of the demodulator 9′ is the output of low pass filter 71 and is used to drive the de-emphasis stage 11′. It should be noted the edge pulse makers 50, 65, 66, and 67 are identical if identical set-reset flip-flops are used.

Figure 7:
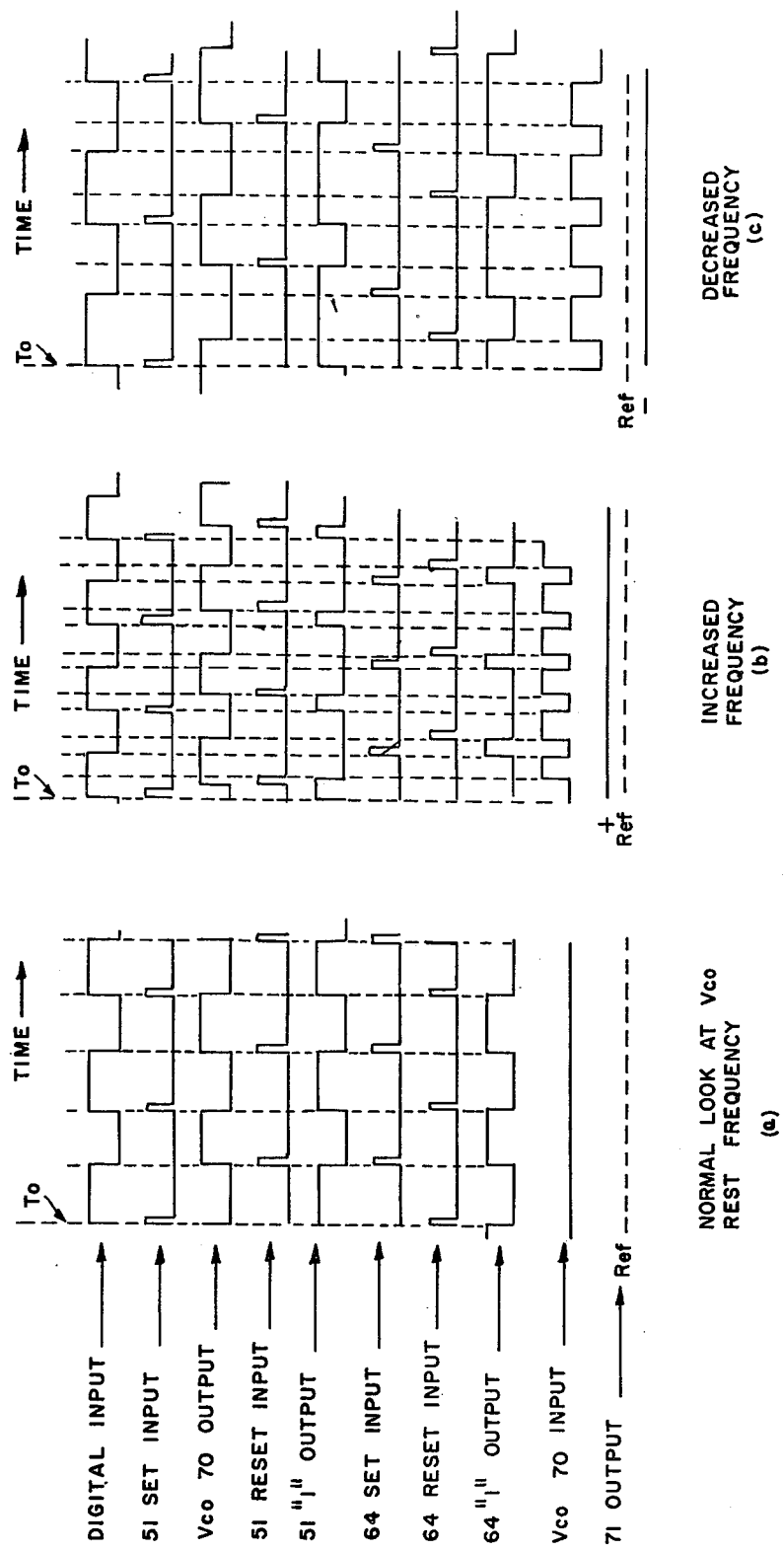
FIG. 7 is a voltage vs. time graph for the dual demodulator of FIG. 6.

To understand operation of the dual demodulator reference should be made to FIG. 7. FIG. 7 shows a voltage vs time graph of various waveforms at individual points within the demodulator. In FIG. 7a waveforms are shown when no phase error between the digital input signal and the voltage controlled oscillator exists or essentially normal lock at the Vco center frequency. FIGS. 7b an 7c show the waveforms at identical individual points within the demodulator when there exists a phase error between the digital input signal and the voltage controlled oscillator due to increased frequency and decreased frequency respectively.

The following description assumes no phase error, therefore the waveforms shown in FIG. 7a will be discussed. Further, assume a time just prior to the time $t_o$. The digital input, flip-flop 51 set input, flip-flop 51 reset input, flip-flop 51 "1 output", flip-flop 64 set input and flip-flop 64 reset input signals are at a low whereas the Vco 70 output and flip-flop 64 "1" output signals are high. As is well-known, or which can be discerned from the waveforms of FIG. 7a, the digital input signal and the Vco output signal are 180° out of phase with one another. At time $t_o$, the digital input goes positive thereby causing edge pulse maker 50 to develop a positive pulse to set the "1" output of flip-flop 51 high. Simultaneous with the above action, Vco 70 produces a low output which is inverted by inverter 69 to drive edge pulse maker 67. Edge pulse maker 69 produces an edge pulse coincident with the edge pulse developed by edge pulse maker 50 and produces a low at the "1" output of flip-flop 64. Diode 52 and diode 61 are therefore forward biased and reversed biased respectively. Forward biasing of the diode 52 causes diode 53 to be reversed biased whereas diode 60 is forward biased. under these conditions, the total current available, "1" will pass via diode 60 and current source 62. As a result of this technique, operational amplifier 55 maintains its output at the reference potential Ref. Low pass filter 51 filters this reference voltage and applies it to de-emphasis stage 11′. As can be discerned, the Vco 70 input voltage control will be that voltage level required for normal lock at the rest frequency. At the first transition of the digital input signal following time $t_o$, the above described procedure is reversed and the available current, "1" will pass via the diode 53.

Should a phase error exist, as shown in FIG. 7b, it should now be obvious that diodes 52 and 61 are simultaneously reversed biased. Diodes 53 and 60 must therefore each pass a current "1." Thus a second current "1" must be supplied through the resistor 57 $t_o$ maintain a current "1" through each diode. The current through the resistor 57 causes a changing voltage at the output of operational amplifier 54 which is used to bring the Vco 70 into step with the incoming digital signal. This changing voltage, when filtered by low pass filter 71 produces an output voltage which is greater than the reference voltage.

If there is a decrease in frequency, as in FIG. 7c, diode 53 and 60 are simultaneously reversed biased and the current "I" passes through the resistor 57 in such a direction as to decrease the voltage to the Vco 70 to bring it into step with the digital input signal. This changing voltage when filtered by low pass filter 71 produces an average decoder output which is lower than the reference value.

Figure 8:
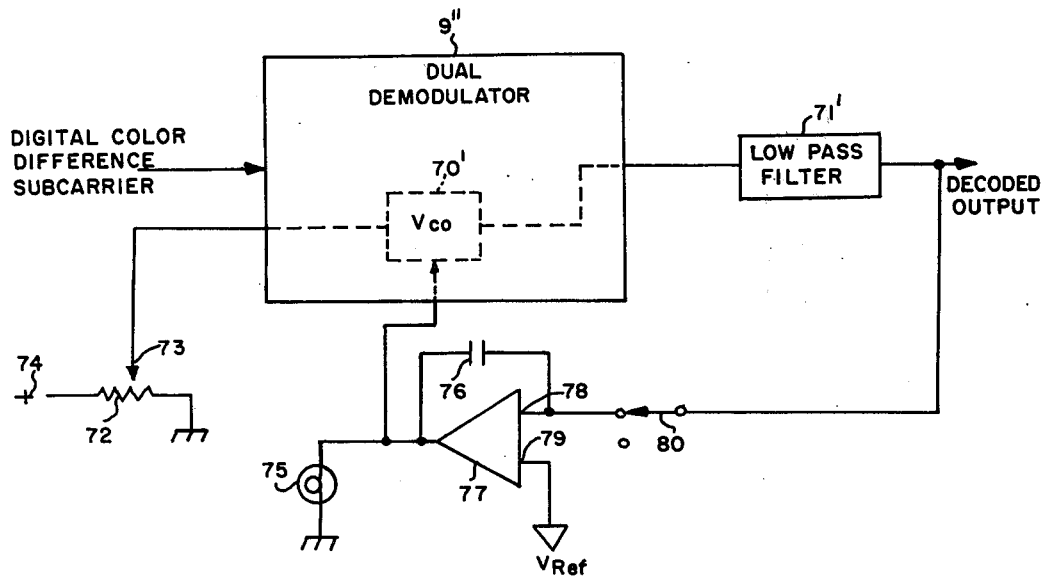
FIG. 8 is another embodiment of a dual demodulator shown in FIG. 2 and FIG. 6.

Another embodiment of the dual demodulator of FIG. 6 is shown in FIG. 8. In this embodiment, a variable resistor 72 is connected between a source of potential 74 and ground. A variable control 73 is connected to the variable voltage controlled oscillator 70′ of the dual demodulator 9″. A switch 80 is connected between the output of the filter 71′ and the first input of an operational amplifier 77 in such a manner that when closed, the output of the low pass filter 71′ is connected to the first input of the operational amplifier 77 and in an open position, no such connection exists. The output of operational amplifier 77 is connected to an indicator device 74, the Vco 70′, and a capacitor 76. The other side of capacitor 76 is connected to the first input of operational amplifier 77 while the other side of the indicator device 74 is connected to ground. The second input of operational amplifier 77 is connected to a source of reference potential V ref. Reference potential V ref is that voltage which corresponds to the correct value of DC output of the demodulator when reference white is being demodulated.

During the transmission of the white reference subcarrier on the back porch of the SECAM composite video signal, switch 80 is closed. As the filtered output of filter 71′ represents the value of the incoming reference white, or more particular, the reference voltage if no phase errors exist, there will be no output from operational amplifier 76.

If no errors exist, the output of operational amplifier causes an indication on the indicator device 75. Thus, indicator 75 becomes an indicator of drift.

Variable resistor 72 can be used in the calibration of the demodulator. if a standard white reference signal is applied to the demodulator, the resistor 72 can be used to set the center frequency of the Vco 70′ so that the filtered output exactly matches the reference voltage V ref.

Figure 9:
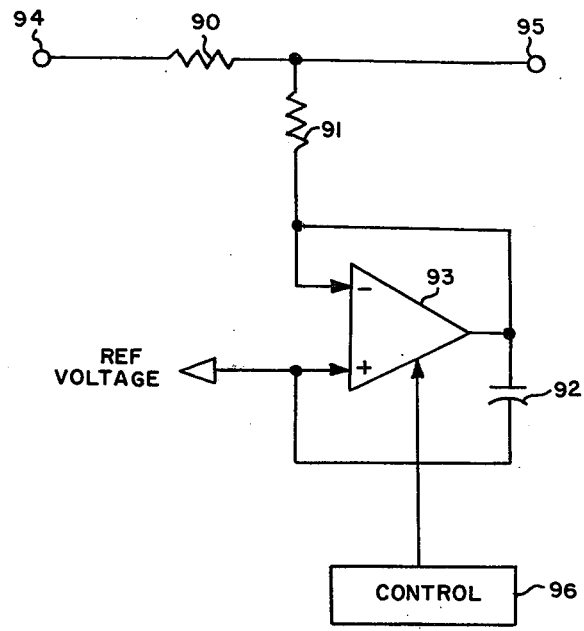
FIG. 9 is a schematic drawing of the switchable de-emphasis network according to the present invention.

Referring now to FIG. 9, there is shown a schematic drawing of the switchable de-emphasis network according to the present invention. As can be discerned from this schematic, an input terminal 94 receives the decoded output from demodulators 9′ or 10′ (two are required) and applies such to the output terminal 95 via the conventional de-emphasis component divider network consisting of the series connected resistors 90, 91 and capacitor 92 connected between input terminal 94 and a source of suitable potential. Such conventional de-emphasis components are well known by those skilled in the art and a discussion thereof is deemed not necessary. According to the present invention however, a transconductance amplifier 93 which is controlled by a switchable control stage 96 has its inverting input (−) and output connected together and simultaneously connected to the junction of the series connected resistor 91 and capacitor 92. The non-inverting input (+) of such amplifier is connected to the already mentioned source of suitable potential.

Briefly considering operation of the switchable de-emphasis network, switchable control stage 96, which can be one of several well known transistor switch types, is switched during the synchronization interval to enable the transconductance amplifier 93. Thus, the inverting input of amplifier 93 is allowed to seek the level of the non-inverting input in a conventional operational amplifier mode. As a result, a voltage potential of zero volts will be across the capacitor 92 and the decoded voltage at input terminal 94 is delivered to output terminal 95 in proportion to the value of the voltage divider which now consists only of the resistors 90 and 91. As a result of this technique, no time constant delay is introduced into the system during synchronization time, namely the blanking interval, so that such time becomes available for measurement and testing to be performed.

Although not yet discussed, it should be evident to those skilled in the art that an accurate reference signal must be supplied to the demodulators for proper operation. This reference signal or burst is normally supplied as a portion of the incoming SECAM signal. However, such incoming burst is also pre-emphasized and as such contains errors. Therefore, for proper operation of the switchable de-emphasis decoder, a pair of controlled oscillators are incorporated. These oscillators are not shown on the drawings as such can be, say, crystal controlled and keyed into the system via the already mentioned switches. The pair of oscillators would thus generate the blue and red color frequencies.

While there has been shown and described the preferred embodiments of the present invention, it will be apparent to those skilled in the art that many changes and modifications may be made without departing therefrom in its broader aspects. For example, in the embodiment of FIG. 8, the switch 80 may be a device such as a field effect transistor to automatically or electrically open and close the switch. Further, the circuit of FIG. 8 could easily be adapted to provide automatic calibration or operation of the demodulator. Therefore, the appended claims are intended to cover all such changes and modifications as fall within the The invention is claimed in accordance with the following:

1. An improved SECAM decoder including separation means for separating a composite video signal into luminance and chrominance components, digital means for digitizing the chrominance components, demodulation means for demodulating the digitized chrominance components, and image means for displaying the luminance and demodulated chrominance components, wherein the improvement comprises:

de-emphasis means for selectively de-emphasizing the demodulated chrominance components connected between the demodulation means and images means; and means for controlling said de-emphasis means during a syncrhonization interval.

2. The decoder according to claim 1 wherein said de-emphasis means includes a transconductance amplifier operatively associated with said means for controlling said de-emphasis means during the synchronization interval.

3. A circuit for de-emphasizing the demodulated chrominance components of a color television signal during synchronization intervals of the signal, which comprises:

means for applying the demodulated chrominance components between an input terminal and an output terminal;

means for de-emphasizing the demodulated chrominance components disposed between both said input and output terminal; and control means associated with said means for de-emphasizing and responsive to the synchronization intervals for selectively de-emphasizing the demodulated chrominance components.

4. The circuit according to claim 3 wherein said means for de-emphasizing includes an amplifier means operatively associated with said control means.

5. The circuit according to claim 4 wherein said amplifier means defines a transconductance amplifier.

* * * * *

UNITED STATES PATENT OFFICE
CERTIFICATE OF CORRECTION

PATENT NO. : 3,949,417
DATED : April 6, 1976
INVENTOR(S) : LARRY ALLAN NELSON

It is certified that error appears in the above-identified patent and that said Letters Patent are hereby corrected as shown below:

Column 2, Line 31, "equivlanet" should be --equivalent--

Column 2, Line 48, "decoding" should be --decoder--

Column 4, Line 32, "hwich" should be --which--

Column 4, Line 58, "limites" should be --limiters--

Column 4, Line 67, "elminate" should be --eliminate--

Column 5, Line 1, " 15"" " should be --15"'--

Column 5, Line 38, "flip-flops," should be --flip-flops.--

Column 6, Line 32, "takne" should be --taken--

Column 6, Line 38, "schmitt" should be --Schmitt--

Column 6, Line 43, "-Vcc" should be -- -Vee --

Column 6, Line 60, "30 input" should be --30 clock input--

Column 6, Line 64, "schmitt" should be --Schmitt--

Column 9, Line 6, "under" should be --Under--

Column 9, Line 6, " "1" " should be --"I"--

Column 9, Line 16, " "1" " should be --"I"--

Column 9, Line 21, " "1" " should be --"I"--

Column 9, Line 22, " "1" " should be --"I"--

Column 9, Line 22 "$t_o$" should be --to--

Column 9, Line 23, " "1" " should be --"I"--

Column 10, Line 2, "if" should be --If--

Signed and Sealed this twenty-ninth Day of June 1976

[SEAL]

Attest:

RUTH C. MASON
Attesting Officer

C. MARSHALL DANN
Commissioner of Patents and Trademarks